United States Patent [19]

Akamatsu et al.

[11] Patent Number: 5,371,835
[45] Date of Patent: Dec. 6, 1994

[54] INDUCTIVELY COUPLED NEURAL NETWORK

[75] Inventors: Norio Akamatsu, Tokushimaken; Azuma Murakami, Saitamaken; Ryuichi Yamane, Saitamaken; Yasuhiro Fukuzaki, Saitamaken; Sadao Yamamoto, Saitamaken, all of Japan

[73] Assignee: Kabushikikashia Wacom, Saitamaken, Japan

[21] Appl. No.: 928,077

[22] Filed: Aug. 12, 1992

Related U.S. Application Data

[63] Continuation-in-part of Ser. No. 540,055, Jun. 19, 1990, abandoned.

[30] Foreign Application Priority Data

Feb. 2, 1990 [JP] Japan ................................ 2-39430

[51] Int. Cl.⁵ .............................................. G06F 15/00
[52] U.S. Cl. ..................................... 395/24; 364/807; G06F/15/00
[58] Field of Search ................... 395/24; 364/807, 822

[56] References Cited

U.S. PATENT DOCUMENTS

| | | | |
|---|---|---|---|
| 3,394,266 | 7/1968 | Martin et al. | 364/900 |
| 3,469,034 | 9/1969 | Stewart | 364/900 |
| 3,476,954 | 11/1969 | Wennick et al. | 307/229 |
| 3,599,009 | 8/1971 | Parmentier | 307/201 |
| 4,163,983 | 8/1979 | Cline et al. | 307/201 |
| 4,207,670 | 6/1980 | Cline et al. | 357/60 |
| 4,752,906 | 6/1988 | Kleinfeld | 364/807 |
| 4,754,759 | 7/1988 | Allocca | 128/421 |
| 4,760,437 | 7/1988 | Denker et al. | 357/30 |
| 4,803,736 | 2/1989 | Grossberg et al. | 382/22 |
| 4,807,168 | 2/1989 | Moopenn et al. | 364/602 |
| 4,809,193 | 2/1989 | Jourjine | 364/513 |
| 4,849,925 | 7/1989 | Peckerar et al. | 364/819 |
| 4,849,940 | 7/1989 | Marks, II et al. | 365/215 |
| 4,866,645 | 9/1989 | Lish | 364/131 |
| 4,873,455 | 10/1989 | de Chamboat et al. | 307/201 |
| 4,873,661 | 10/1989 | Tsividis | 364/807 |
| 4,875,183 | 10/1989 | Graf et al. | 364/807 |
| 4,876,731 | 10/1989 | Loris et al. | 382/40 |
| 4,884,216 | 11/1989 | Kuperstein | 364/513 |
| 4,885,757 | 12/1989 | Provence | 375/96 |
| 4,891,782 | 1/1990 | Johnson | 364/786 |
| 4,896,053 | 1/1990 | Kesselring | 307/201 |
| 4,897,811 | 1/1990 | Scofield | 364/900 |
| 4,967,369 | 10/1990 | Jourjine | 364/807 |
| 5,122,227 | 6/1992 | Ott | 156/644 |

FOREIGN PATENT DOCUMENTS

411341 2/1991 European Pat. Off. ............. 395/24

OTHER PUBLICATIONS

Microelectronics; 1977; Scientific American, Inc.; pp. 12, 14, 15.
Electronics Engineers' Handbook; Donald G. Fink; 1975; McGraw-Hill, Inc.; pp. 7-10, 7-11, 13-22, 13-23, 20-94; 20-95.
A Magnetic Power and Communication Interface for a CMOS Die; 1988 IEEE Inter. Solid-State Circuits Conf.; Malamy et al.; pp. 264-265 and 398-399.
A Magnetic Power and Communication Interface for a CMOS Intergrated Circuit; IEEE Journal of Solid-State Circuits; Glasser et al.; vol. 24, No. 4, Aug. 1989; pp. 1146-1149.

Primary Examiner—Robert W. Downs
Attorney, Agent, or Firm—Lowe, Price, LeBlanc & Becker

[57] ABSTRACT

A neural coupling includes a pair of primary and secondary members for coupling a precedent node to a subsequent node to synaptically transmit a signal through a neural network. A primary member responds to a signal from a precedent node to generate an inductive field according to the received signal. A secondary member spatially coupled to the primary member by the inductive field supplies to a subsequent node a corresponding signal in response to the inductive field to effect synaptic transmission of the signal through the neural network.

9 Claims, 12 Drawing Sheets

INDUCTIVELY COUPLED NEURAL NETWORK

This application is a continuation-in-part of application Ser. No. 07/540,055 filed Jun. 19, 1990, now abandoned.

BACKGROUND OF THE INVENTION

The present invention relates to a neural network and neural coupling of neurons which constitute the neural network.

A proposed prior art type of the computer includes a neural network operating in a mode similar to information processing in the human brain.

This type of device processes mathematically random matter such as pattern recognition and associative memorization, which could not be satisfactorily processed by the sequential processing mode Neumann type computer.

In FIG. 2 is shown an elementary prior art neuron unit of a neural network. The neuron 1 receives n input signals $x_1, x_2, \ldots x_i, \ldots x_n$ and multiplies each by a synaptic coupling weight $w_1, w_2, \ldots w_i, \ldots w_n$. Neuron 1 calculates the sum of the multiplication results. The neuron 1 adds a specific threshold value h to the sum and operates on the added result with a nonlinear function to thereby derives an output signal y. Such operation is mathematically represented by the following relation:

$$y = f(\Sigma_1 w_i x_i + h) \quad (1)$$

In the operation, if the synaptic coupling weight $w_i$ is positive, it provides an excitatory synaptic coupling, while if the synaptic coupling weight $w_i$ is negative, it provides an inhibitatory synaptic coupling. When simulating a neuron in a mathematical form, the nonlinear function is normally represented by the following sigmoid function:

$$f(x) = 1; \{1 + exp(-x)\} \quad (2)$$

FIG. 3 is a block diagram of the neuron performance. The neuron is comprised of a multiplication and summation unit 2 for multiplying synaptic coupling weights $w_i$ with the corresponding input signals $x_i$ to obtain the sum of the multiplication results. Nonlinear operating unit 3 adds a specific threshold value to the sum and nonlinearly processes the added result. The value of the synaptic coupling weight $w_i$ is determined according to an adaptive learning function unit (not shown) based on back-propagation method.

FIG. 4 is a block diagram of an example of a prior art neural network. In the Figure, the neural network includes input terminals $4_1, 4_2, \ldots 4_i, \ldots 4_l$, primary neurons $5_1, 5_2, \ldots 5_j, \ldots 5_m$, secondary neurons $6_1, 6_2, \ldots 6_k, \ldots 6_n$, and output terminals $7_1, 7_2, \ldots 7_k, \ldots 7_n$. The input terminals $4_1, 4_2, \ldots 4_i, \ldots 4_l$ receive each of l number of input signals $a_1, a_2, \ldots a_i, \ldots a_l$. These input signals are distributed to and supplied to m neurons $5_1, 5_2, \ldots 5_j, \ldots 5_m$. Each of the neurons $r_2, 5_2, \ldots 5_j, \ldots 5_m$ carries out the before-mentioned multiplication and summation operations and nonlinear processing. Further, output signals of the primary neurons $5_1, 5_2, \ldots 5_j, \ldots 5_m$ are distributed and supplied into respective one of n secondary neurons $6_1, 6_2, \ldots 6_k, \ldots 6_n$. Each of the neurons $6_1, 6_2, \ldots 6_k, \ldots 6_n$ also carries out the before-mentioned multiplication and summation operation and the subsequent nonlinear processing, such that respective output signals $b_1, b_2, \ldots b_k, \ldots b_n$ are derived from n output terminals $7_1, 7_2, \ldots 7_k, \ldots 7_n$. The values of the synaptic coupling weights of respective neurons $5_1$-$5_m$ and $6_1$-$6_n$ are determined by a controlling learning function unit (not shown). The neural network is supplied with a set of input signals $a_1$ - $a_l$, the processed results of which are known as a set of output signals $b_1$ - $b_n$. A current set of output signals is compared with the known output signals to determine the value of synaptic coupling weights by the learning function unit through the back-propagation method. By repeating such procedure a appropriate number of times, the final synaptic coupling weights are adaptively adjusted to produce optimum output signals when the input signals $a_1$ - $a_l$ are supplied to the neural network.

As described above, according to adaptive learning by the learning function unit, the neural network can organize itself so as to obtain correct output signals $b_1$ - $b_n$ from input signals $a_1$ - $a_l$. Therefore, the neural network does not need any specific algorithm or program for processing the signals. Moreover, the neural network can process of multiple of data concurrently in parallel so as to provide high speed processing of mathematically random data such as derived during pattern recognition and associative memorization.

The performance of the neural network depends the number of neurons, and performance is more effective as the number of neurons increases. However, when increasing the number of neurons, there is a corresponding increase in the number of couplings between the input terminals and the neurons and between the neurons with each other. Generally, when the number of neurons is multiplied by n-, the number of couplings is increased on the order of $n^2 \neq$ times.

The currently available integrated circuit technology is only applicable to a two-dimensional substrate, and the number of multi-layered patterns is limited to a certain degree. Therefore, in order to construct a neural network as shown in FIG. 4 in the form of an integrated circuit, the number of available neurons is considerably restricted, thereby causing a problem. There has been experimentally produced various types of the neural networks. For example, patterns are formed to constitute couplings between input terminals and neurons and among the neurons. The patterns are commonly used in the time-sharing mode for a plurality of input terminals and neurous so as to reduce the actual number of neural couplings. In another conventional neural network, photoemitters, photodetecters, optical fibers and spatial photomodulators are used to provide effective spatial couplings to transmit optical signals between input terminals and neurons and among neurons. Coupling weights can be also optically set in the neural network.

However, in the prior art, perfect parallel processing cannot be performed. In the latter type of the prior art, presently available optical technology is not sufficiently sophisticated to enable device size reduction, and it would be difficult to continuously change coupling weight according to learning results. Either of the prior art structures has drawbacks to impair essential neural network features.

SUMMARY OF THE INVENTION

In view of the above noted drawbacks of the prior art, an object of the present invention is to provide neural couplings in the neural network for coupling in parallel the input terminals and the neurous with each other and the neurons by one another with using readily available fabrication technology, without causing device scale-up.

In order to achieve the above noted object, according to a first aspect of the present invention, there is provided a neural coupling method comprising inductively coupling an input terminal and a neuron with each other and inductively coupling a pair of neurons with each other with a magnetic field, or an electromagnetic field.

According to a second aspect, the neural network comprises input terminals, neurons, and a coupling device or circuit for inductively coupling an input terminal and inductively a neuron with each other and coupling a pair of neurons with each other with a magnetic field or electromagnetic field.

According to a third aspect, the coupling device comprises at least a pair of inductance elements magnetically coupled to each other by a magnetic field. According to a fourth aspect, an inductance element comprises a coil. According to a fifth aspect, a inductance element comprises a magneto-resistance element. According to a sixth aspect, the coupling circuit comprises at least a resonance circuit for electromagnetic field coupling. According to a seventh aspect, a neural network comprises a plurality of input terminals, a plurality of primary neurons each having an output, a secondary neuron having an input, a plurality of primary coils magnetically coupled to one another. Each coil is connected to a respective one of the input terminals or each output of the primary neurons. A secondary coil magnetically coupled to the primary coils is connected to the input of the secondary neuron.

According to an eighth aspect, the neural network comprises a plurality of input terminals, a plurality of primary neurons each having an output, and multiple primary coils each connected to each of the input terminals or each output of the primary neurons. Multiple secondary coils are each magnetically coupled to a set of the primary coils. The primary coils are selected from different groups of the primary coils corresponding to respective input terminals or respective outputs of the primary neurons. Multiple secondary, and a multiple of secondary neurons each having an input are connected to each of the secondary coils.

According to a ninth aspect, the neural network includes a plurality of resonance circuits containing the corresponding coils. According to a tenth aspect, the neural network includes a plurality of impedance elements each connected in parallel or series to a corresponding coil to define a synaptic coupling weight. According to an eleventh aspect, each impedance element has a impedance variable to adjust synaptic coupling weight.

With regard to the first aspect of the present invention, since the input terminal and the neuron or the pair of neurons are inductively by a coupled magnetic or electromagnetic field, multiple input terminals and neurons or multiple neurons can be spatially coupled by readily available technology to achieve overall parallel coupling with each other.

With regard to the second aspect, since a coupling device or circuit is utilized to inductively couple between an input terminal and a neuron or between a pair of neurons through a magnetic field, multiple input terminals and neurons and multiple neurons can be spatially coupled with each other by mature technology so as to provide a neural network having parallel couplings.

With regard to the third aspect, at least a pair of magnetically coupled inductance elements are used as a coupling device through a magnetic field so as to facilitate neural network circuit design.

With regard to the fourth aspect, since the inductance element is composed of a coil, couplings can be constructed economically with less spacing between input terminals and neurons and among the neurons.

With regard to the fifth aspect, since a magneto-resistance element is used as the inductance element, the coupling can be effected with a DC magnetic field as well as AC magnetic field.

With regard to the sixth aspect, since at least one resonance circuit is used as the coupling circuit with a magnetic field, efficient spatial couplings can be constructed between input terminals and neurons and among neurons.

With regard to the seventh aspect, because the neural network includes plural input terminals, plural primary neurons each having an output, a secondary neuron having an input, plural primary coils magnetically coupled to each other and connected to each of the input terminals or each output of the primary neurons, and a secondary coil magnetically coupled to the primary coils and connected to the input of the secondary neuron, the parallel couplings can be constructed between the plural input terminals and the secondary neuron and between the plural primary neurons and the secondary neuron.

With regard to the eight aspect, since the neural network includes plural input terminals, plural primary neurons each having an output, multiple primary coils each connected to each of the input terminals or each output of the primary neurons, multiple secondary coils each magnetically coupled to a set of the primary coils each selected from different groups of the primary coils corresponding to respective input terminals or respective outputs of the primary neurons, and multiple secondary neurons each having an input connected to each of the secondary coils; the parallel couplings can be constructed between the plural input terminals or the plural primary neurons and the multiple secondary neurons.

With regard to the ninth aspect, since all or part of the coils are incorporated into a resonance circuit, the couplings can be constructed efficiently in parallel between the plural input terminals or the plural primary neurons and the single or multiple secondary neuron.

With regard to the tenth aspect, since an impedance element is connected in series or parallel to the coil or resonance circuit to define the synaptic coupling weights, the couplings can be ensured between the plural input terminals or the plural primary neurons and the single or multiple secondary neuron to enable the secondary neuron to effect multiplication and summation operations.

With regard to the eleventh aspect, since the synaptic coupling weight can be adjusted by changing impedance of the impedance element, the multiplication and summation operations can be controllably carried out in a single or multiple neurons.

DETAILED DESCRIPTION OF THE INVENTION

Figure 1:
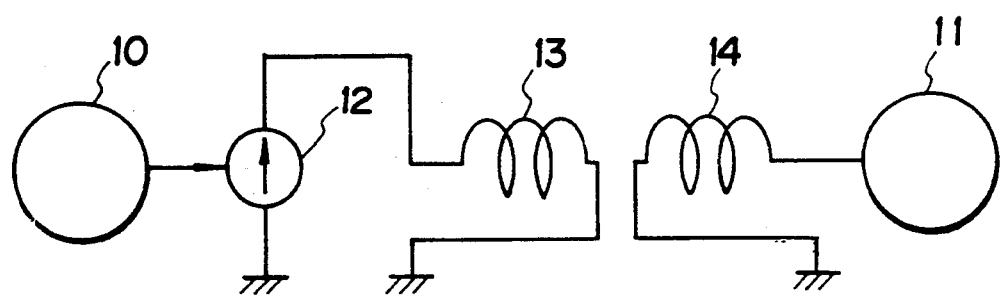
FIG. 1 is a circuit diagram of a first embodiment of the present invention.
Figure 2:
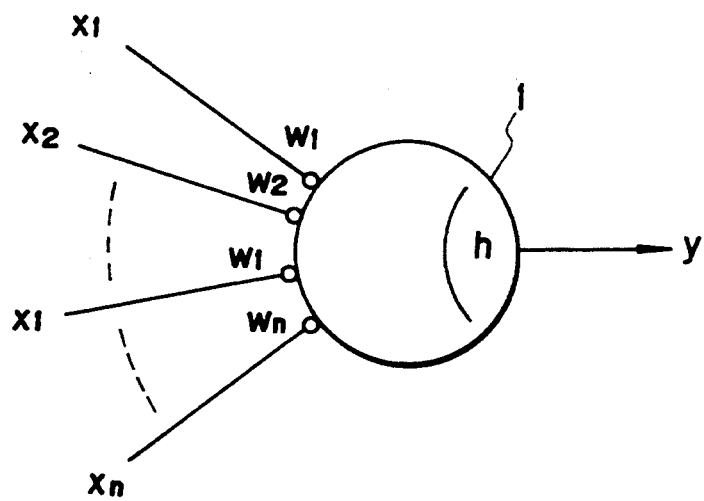
FIG. 2 is an illustrative diagram of a prior art neuron of a neural network.
Figure 3:
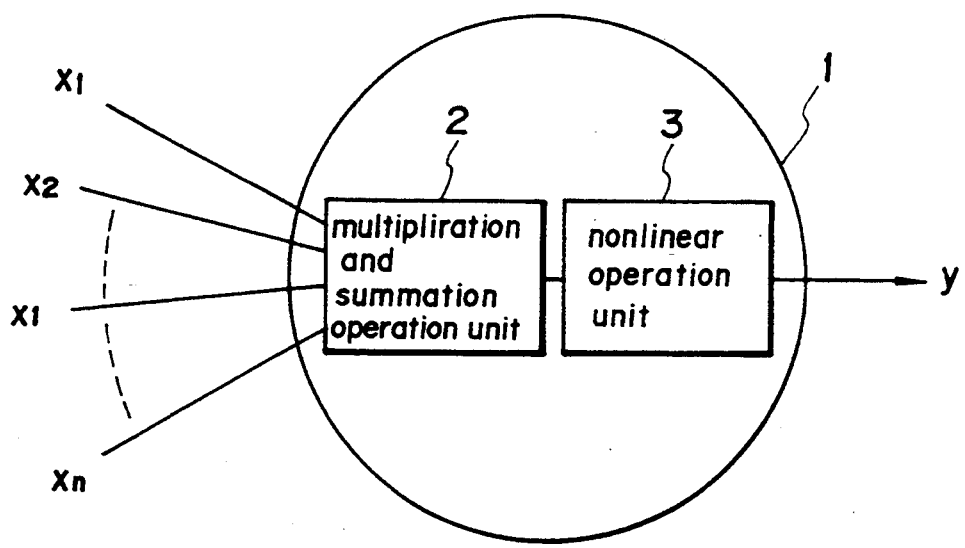
FIG. 3 is a block diagram of a prior art neuron.

FIG. 1 is shown a first embodiment of the present invention, in which a pair of nodal neurons 10 and 11 are coupled to each other through inductive AC magnetic field with using an alternating current source 12 and coils 13 and 14. An output current of the alternating current source 12 is controlled by an output signal of the precedent nodal neuron 10. The coils 13 and 14 are connected, respectively, to the alternating current source 12 and to an input of the subsequent nodal neuron 11, and they are arranged to magnetically couple with each other. In such structure, the alternating current source 12 feeds an alternating current to the coil 13 according to an output value of the neuron 10 to generate an inductive AC magnetic field in the coil 13. The AC magnetic field is effective to generate in the coil 14 an induced voltage proportional to the output value of the neuron 10, and the induced voltage is inputted into the neuron 11.

Figure 5:
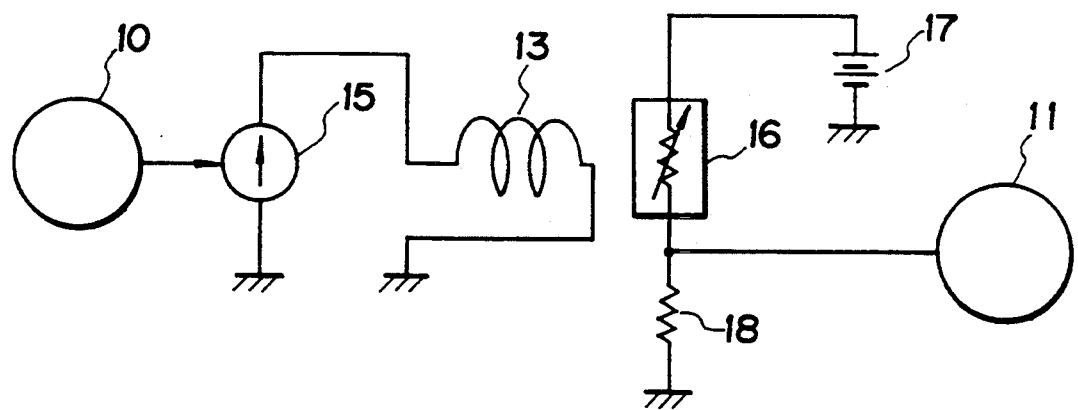
FIG. 5 is a circuit diagram of a second embodiment of the invention.
Figure 4:
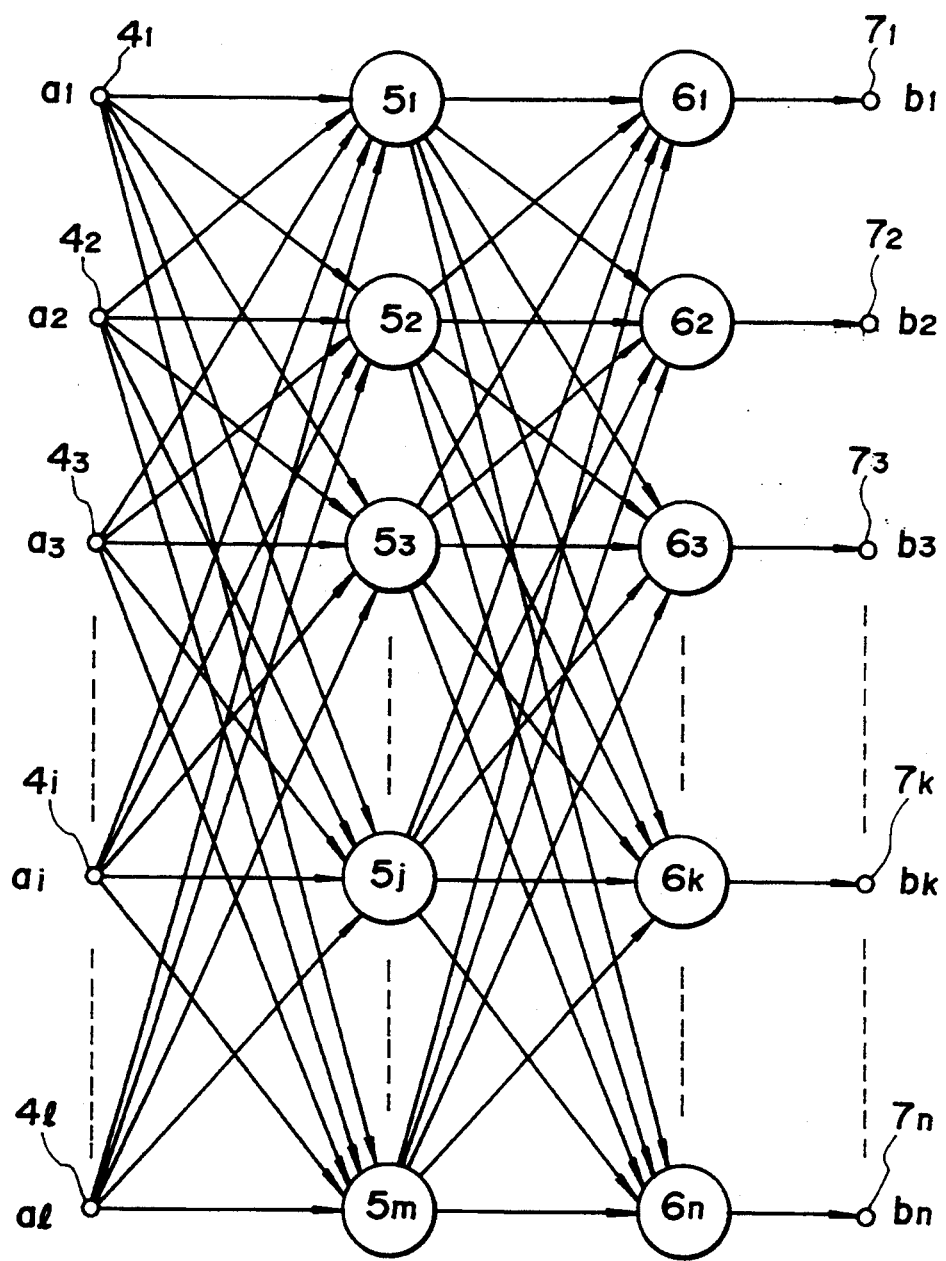
FIG. 4 is a diagram of an exemplary prior art neural network.

FIG. 5 is shown a second embodiment of the present invention in the form of a neural coupling through inductive DC magnetic field. As shown in the figure, the neural coupling is comprised of a pair of neurons 10 and 11, a coil 13, a direct current source 15, a magnetoresistance element 16, a constant voltage source 17 and a resistor 18. An output current of the direct current source 15 is controlled by an output signal of the precedent neuron 10. The coil 13 is connected to the direct current source. The magnetoresistance element 16 is connected at its one end to the constant voltage source 17, and connected at its other end to ground through the resistor 18 and to an input of the subsequent neuron 11. The coil 13 and the magnetoresistance element 16 are arranged to be magnetically coupled with each other.

In the above described construction, the direct current source 15 feeds a direct current according to an output value of the neuron 10 to the coil 13 to generate therein a DC magnetic field. The DC magnetic field changes the resistance value of the magnetic resistance element 16 proportionally to the output value of the neuron 10. The change of the resistance value causes a corresponding change of an electric current flowing from the constant voltage source 17 through the magnetic resistance element 16 to the resistor 18. A voltage drop developed across the resistor 18 due to the flowing electric current is supplied into the neuron 11 so that the neuron 11 receives a voltage having a magnitude proportional to the output value of the neuron 10.

Figure 6:
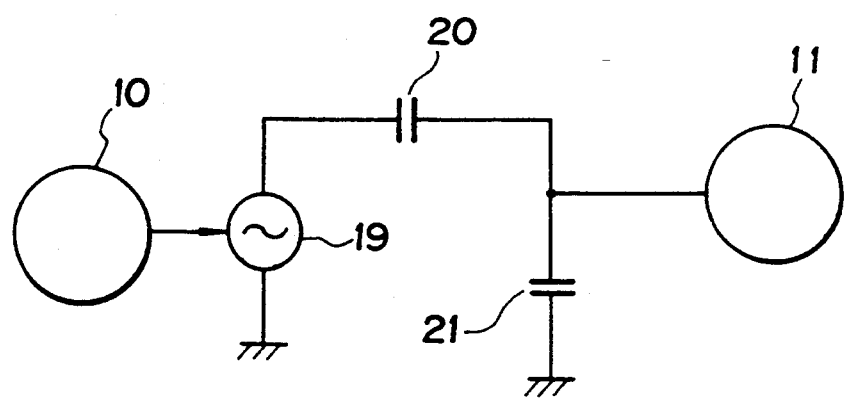
FIGS. 6 and 7 are circuit diagrams of neural networks with capacitive coupling.

In FIG. 6 is shown a neural coupling arrangement using an AC electric field. As shown in the Figure, neural coupling between a pair of neurons 10 and 11 is provided by AC voltage source 19 and capacitors 20, 21. The AC voltage source 19 is controlled by an output signal of the neuron 10. The capacitor 20 is connected at its one electrode to the AC voltage source 19, and is connected at its other electrode to an input of the neuron 11 and to one terminal of the capacitor 21. The other terminal of the capacitor 21 is connected to the ground. In such construction, the AC voltage source 19 applies an AC voltage according to the output value of the neuron 10 to one electrode of the capacitor 20 to generate therein an AC electric field. The AC electric field is effective to induce at the other electrode of the capacitor 20 a voltage proportional to the output value of the neuron 10, and the induced voltage is supplied into the neuron 11.

Figure 7:
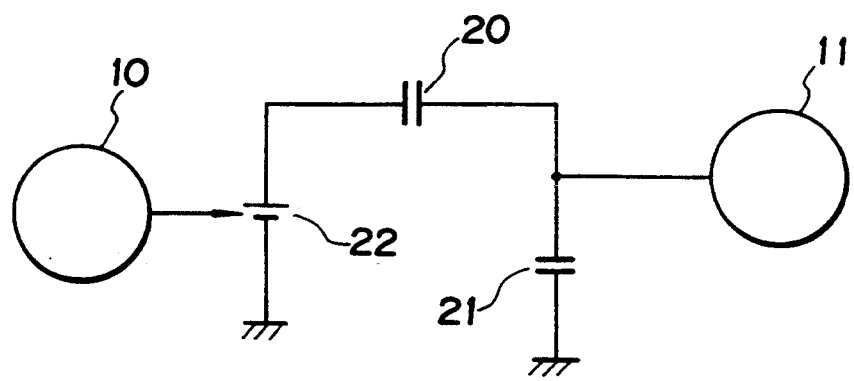

In FIG. 7 is shown a neural coupling arrangement using a DC electric field. In the Figure, the neural coupling between neurons 10 and 11 is provided by capacitors 20, 21 and a DC voltage source 22. The DC voltage source 22 is controlled by an output signal of the neuron 10. One electrode of capacitor 20 is connected to the DC voltage source 22, while another electrode of the capacitor is connected to an input of the neuron 11 and to one terminal of the capacitor 21. The other terminal of the capacitor 21 is connected to the ground. In such construction, the DC voltage source 22 applies a DC voltage according to the output value of the neuron 10 to the one electrode of the capacitor 20 to generate therein a DC electric field. The DC electric field induces at the other electrode of the capacitor 20 a voltage proportional to the output value of the neuron 10. The induced voltage is supplied to the neuron 11.

Figure 8:
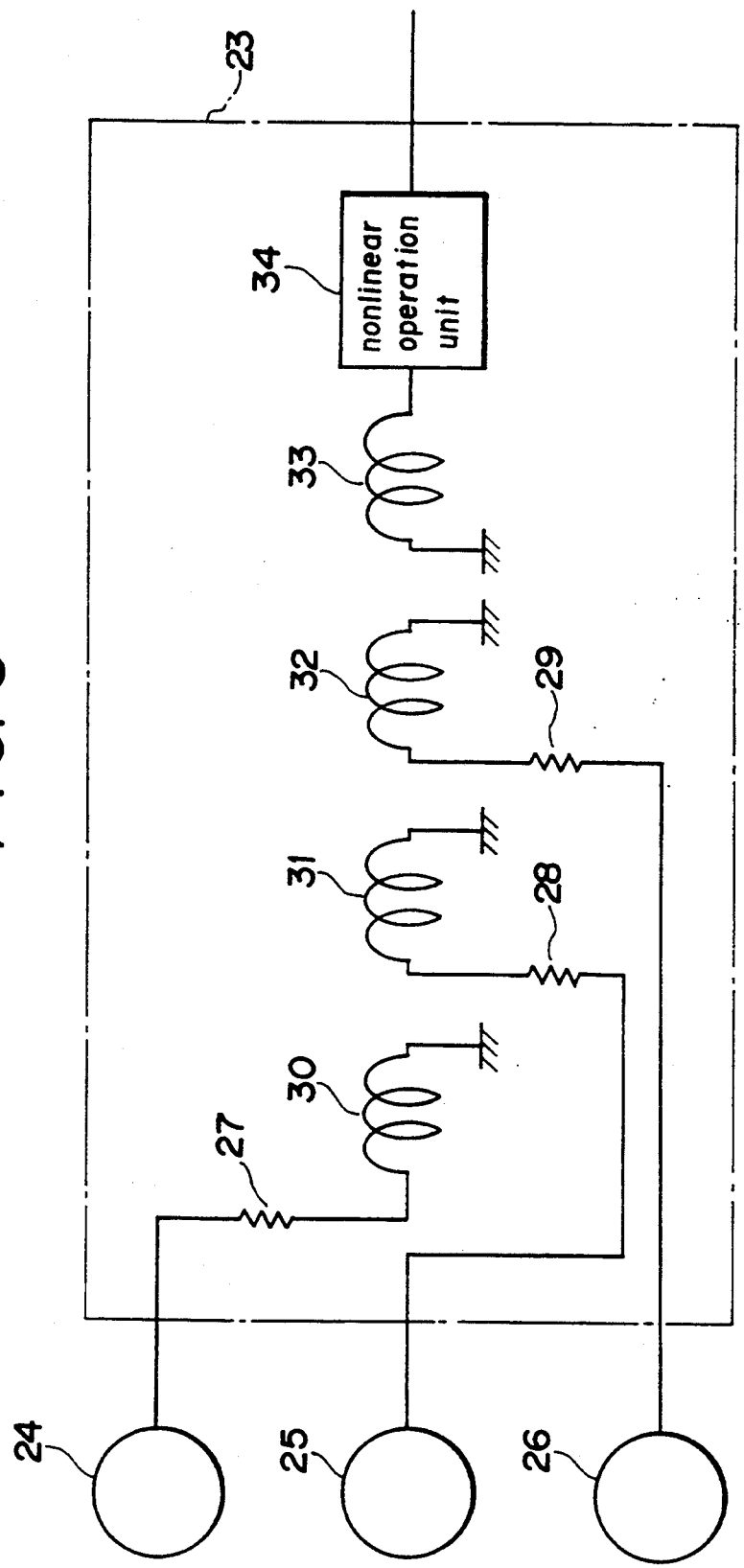
FIG. 8 is a circuit diagram of an embodiment of the invention with inductive coupling.

FIG. 8 is shown another embodiment of the present invention in the form of neural coupling utilizing an AC magnetic field and designed to carry out concurrent multiplication and summation operations. In the figure, neural coupling between neurons 23, 24, 25 and 26 is via, resistors 27, 28 and 29, coils 30, 31, 32 and 33 and a nonlinear operating unit 34. neuron 23 is comprised of the resistors 27, 28 and 29, the coils 30, 31, 32 and 33, the nonlinear operating unit 34 and a learning function unit (not shown). The resistors 27, 28 and 29 constitute synaptic coupling weights together with the coils 30, 31, 32 and 33; the resistance values of resistors 27–29 are determined by the learning function unit. One terminal of the respective resistors 27, 28 and 29 is connected to a corresponding output terminal of the respective precedent neurons 24, 25 and 26, and the other terminal of the respective resistors 27, 28 and 29 is connected to corresponding one of the coils 30, 31 and 32. The coil 33 is connected to the nonlinear operating unit 34. The coils 30, 31, 32 and 33 are arranged to be magnetically coupled in series with each other. Each of neurons 23–26 derives, a separate AC voltage signal.

In the above described construction, the respective each of coils 30, 31 and 32 is responsive to an alternating current having an amplitude depending on the output voltage values of the neurons 24, 25 and 26, the resistance values of the resistors 27, 28 and 29 and reactances of the coils 30, 31, 32 and 33 so as to generate DC magnetic fields. These DC magnetic fields are combined with each other to induce in the coil 33 a voltage proportional to the sum of voltages coils 24, 25 and 26 and proportional to the synaptic coupling weights determined by the resistors 27, 28 and 29 and the coupling coefficients of coils 30, 31, 32 and 33. The voltage induced in coil 33 is supplied to the nonlinear operating unit 34 and is nonlinearly processed. In this embodiment, coils are utilized for the generation and detection of the AC magnetic field; however, other elements can be used. Any impedance element can be used in place of a resistor for constituting synaptic coupling weight. Further, the synaptic compling can be based on induction through DC magnetic field, or AC electric field so as to concurrently effect the multiplication and summation operation in manner similar to the fifth embodiment.

Figure 9:
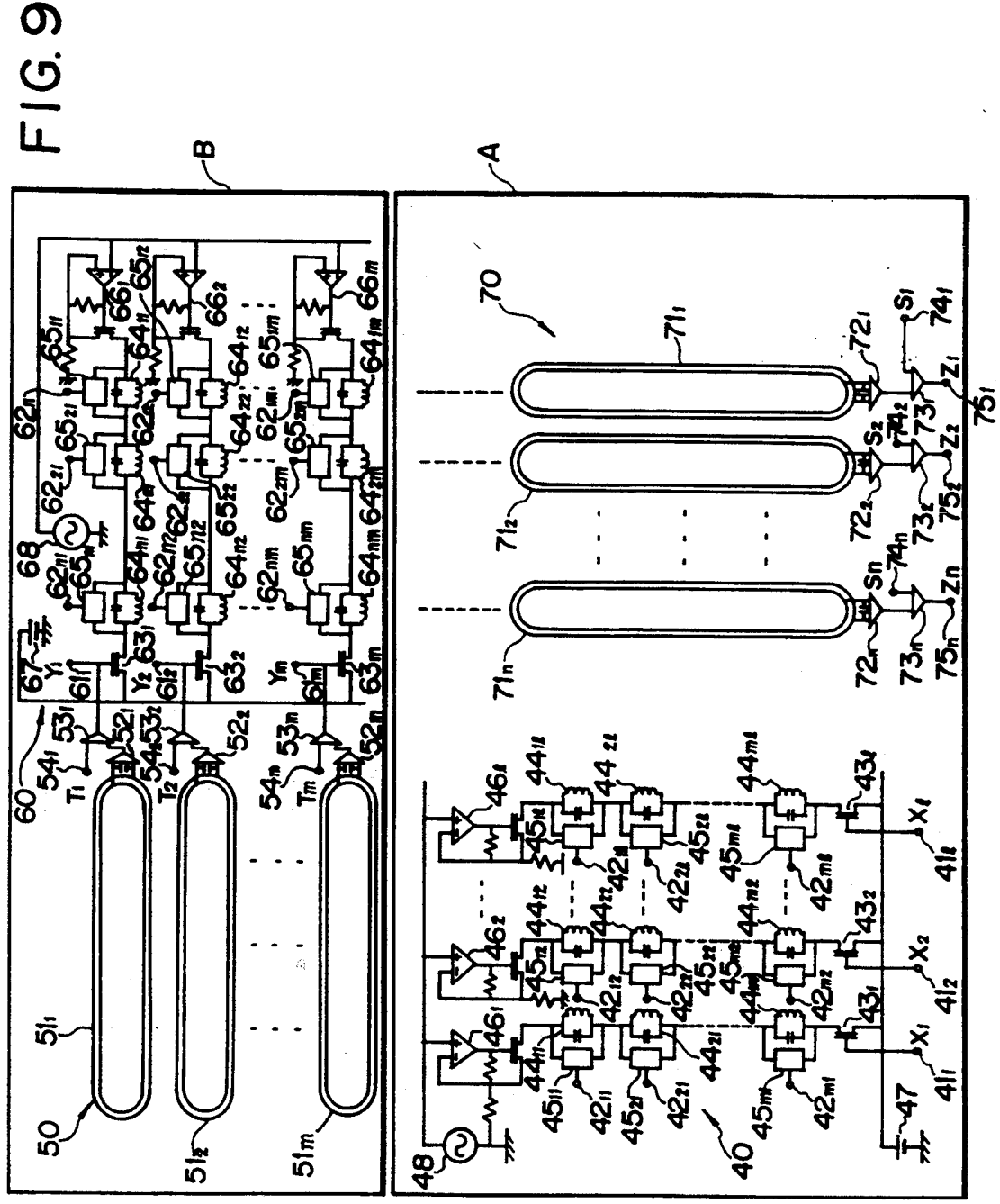
FIG. 9 is a circuit diagram of another embodiment of the invention with inductive electromagnetic coupling.

In FIG. 9 is shown a further embodiment of the present invention in the form of neural network through electromagnetic field coupling effective to carry out concurrent multiplication and summation operations. In the Figure, the neural network is comprised of input nodes or terminals $41_1, 41_2, \ldots 41_l$ arranged in one row, synaptic coupling weight control terminals $42_{11}, 42_{12}, \ldots 42_{1l}, 42_{21}, 42_{22}, \ldots 42_{2l}, \ldots 42_{m1}, 42_{m2}, \ldots 42_{ml}$ arranged in m rows and l columns, transistors (FETs) $43_1, 43_2, \ldots 43_l$ arranged in one row, resonance circuits $44_{11}, 44_{12}, \ldots 44_{1l}, 44_{21}, 44_{22}, \ldots 44_{2l}, \ldots 44_{m1}, 44_{m2}, \ldots 44_{ml}$ arranged in an array of m rows and l columns and each being composed of a coil and a capacitor, impedance elements $45_{11}, 45_{12}, \ldots 45_{1l}, 45_{21}, 45_{22}, \ldots 45_{2l}, \ldots 45_{ml}, 45_{m2}, \ldots 45_{ml}$ arranged in m rows and l columns, constant current circuits $46_1, 46_2, \ldots 46_l$ arranged in one row and each being composed of an operational amplifier, a transistor and a resistor, a direct current source 47, and an alternating current source 48. These elements constitute a first block 40.

A second block 50 is comprised of m parallel rows of linear resonance circuits $51_1, 51_2, \ldots 51_m$, each circuit being composed of a coil and a capacitor, a column of differential amplifiers $52_1, 52_2, \ldots 52_m$, a column of comparators $53_1, 53_2 \ldots 53_m$, and a column of threshold value input terminals $54_1, 54_2, \ldots 54_m$.

A third block 60 is comprised of a column of intermediate output nodes or terminals $61_1, 61_2, \ldots 61_m$, m rows and n columns of synaptic coupling weight control terminals $62_{11}, 62_{12}, \ldots 62_{1m}, 62_{21}, 62_{22}, \ldots 62_{2m}, \ldots 62_{n1}, 62_{n2}, \ldots 62_{nm}$, a column of transistors (FETs) $63_1, 63_2, \ldots 63_m$, an array of m rows and n columns of resonance circuits $64_{11}, 64_{12}, \ldots 64_{1m}, 64_{21}, 64_{22}, \ldots 64_{2m}, \ldots 64_{n1}, 64_{n2}, \ldots 64_{nm}$, each being composed of a coil and a capacitor, m rows and n columns of impedance elements $65_{11}, 65_{12}, \ldots 65_{1m}, 65_{21}, 65_{22}, \ldots 65_{2m}, \ldots 65_{n1}, 65_{n2}, \ldots 65_{nm}$, a column of constant current circuits $66_1, 66_2, \ldots 66_m$, each being composed of an operational amplifier, a transistor and a resistor, a direct current source 67, and an alternating current source 68.

A fourth block 70 is comprised of n parallel columns of linear resonance circuits $71_1, 71_2, \ldots 71_n$, each composed of a coil and a capacitor, a row of differential amplifiers $72_1, 72_2, \ldots 72_n$, a row of comparators $73_1, 73_2, \ldots 73_n$, a row of threshold value input terminals $74_1, 74_2, \ldots 74_n$, and a row of output nodes or terminals $75_1, 75_2, \ldots 75_n$.

The first block 40 and the fourth block 70 are formed integrally on a planar substrate A as shown in the figure, and the second block 50 and the third block 60 are formed integrally on a planar substrate B as shown in the figure. The pair of substrates A and B are superposed with each other to constitute the neural network such that the first block 40 and the second block 50 face each other, and the third block 60 and the fourth block 70 face each other. In such arrangement, electromagnetic coupling is provided between the first block 40 and the second block 50 such that the first row of resonance circuits $44_{11}, 44_{12}, \ldots 44_{1l}$ corresponds to the first row of resonance circuit $51_1$, the second row of resonance circuits $44_{21}, 44_{22}, \ldots 44_{2l}$ corresponds to the second row of resonance circuit $51_2$, and the m-th row of resonance circuits $44_{m1}, 44_{m2}, \ldots 44_{ml}$ corresponds to the m-th row of resonance circuit $51_m$. In similar manner, with regard to the third block 60 and the fourth block 70, electromagnetic coupling is provided between the first column of resonance circuits $64_{11}, 64_{12}, \ldots 64_{1m}$ and the first column of resonance circuit $71_1$, between the second column of resonance circuits $64_{21}, 64_{22}, \ldots 64_{2m}$ and the second column of resonance circuit $71_2$, and between the n-th column of resonance circuits $64_{n1}, 64_{n2}, \ldots 64_{nm}$ and the n-th column of resonance circuit $71_n$.

Next, the description is given for flow or transmission of signals. l is the number of input signals $X_1, X_2, \ldots X_l$, respectively, supplied in parallel to the row of input terminals $41_1, 41_2, \ldots 41_l$ of the first block 40. The input signal distributed by the row of corresponding transistors $43_1, 43_2, \ldots 43_l$ to the corresponding columns of resonance circuits $44_{11}, 44_{21}, \ldots 44_{m1}$. /$44_{12}, 44_{22}, \ldots 44_{m2}$/ $\ldots$ /$44_{1l}, 44_{2l}, \ldots 44_{ml}$. The distributed set of the input signals $X_1, X_2, \ldots X_l$ is transmitted as inductive electromagnetic wave from the respective rows of the resonance circuits $44_{11}, 44_{12}, \ldots 44_{1l}$ /$44_{21}, 44_{22}, \ldots 44_{2l}$/ $\ldots$ /$44_{m1}, 44_{m2}, \ldots 44_{ml}$ to the corresponding rows of the resonance circuits $51_1, 51_2, \ldots 51_m$ by the inductive electromagnetic coupling therebetween, and consequently the set of the input signals $X_1, X_2, \ldots X_l$ are added to each other in the respective resonance circuit $51_1, 51_2, \ldots 51_m$.

Each of the resonance circuits $44_{11}$-$44_{ml}$ is connected in parallel to each of the impedance elements $45_{11}$-$45_{ml}$. Therefore, the set of input signals $X_1, X_2, \ldots X_l$ are added to each other through each row of couplings according to the respective synaptic coupling weights determined according to the impedance value of the elements $45_{11}$-$45_{ml}$ and the impedance of the resonance circuits $44_{11}$-$44_{ml}$ and the impedance of the resonance circuits $51_1$-$51_m$. The synaptic coupling weights are adaptively adjusted by setting impedances of the impedance elements $45_{11}$-$45_{ml}$ by means of a learning function unit (not shown) connected thereto through the synaptic coupling weight controlling terminals $42_{11}$-$42_{ml}$.

Output signals from the resonance circuits $51_1, 51_2, \ldots 51_m$ are amplified, respectively, by the column of differential amplifyers $52_1, 52_2, \ldots 52_m$, and then compared by the column of comparators $53_1, 53_2, \ldots 53_m$ with the respective threshold values $T_1, T_2, \ldots T_m$ which are supplied separately by the threshold value input terminals $54_1, 54_2, \ldots 54_m$ so as to produce m number of intermediate output signals $Y_1, Y_2, \ldots Y_m$. The set of intermediate output signals $Y_1, Y_2, \ldots Y_m$ are supplied, respectively, to external circuits via the column of intermediate output terminals $61_1, 61_2, \ldots 61_m$ of the third block 60, and are distributed through the column of transistors $63_1, 63_2, \ldots 63_m$ to the respective rows of resonance circuits $64_{11}, 64_{21}, \ldots 64_{n1} / 64_{12}, 64_{22}, \ldots 64_{n2} / \ldots / 64_{1m}, 64_{2m}, \ldots 64_{nm}$. Then the set of distributed intermediate output signals is transmitted from the respective columns of resonance circuits $64_{11}, 64_{12}, \ldots 64_{1m} / 64_{21}, 64_{22}, \ldots 64_{2m} / \ldots / 64_{n1}, 64_{n2}, \ldots 64_{nm}$ to the corresponding columns of resonating circuits $71_1, 72_2, \ldots 71_n$ of the fourth block 70, which are electromagnetically coupled to the corresponding columns of resonance circuits $64_{11}, 64_{12}, \ldots 64_{1m} / 64_{21}, 64_{22}, \ldots 64_{2m} / \ldots / 64_{n1}, 64_{n2}, \ldots 64_{nm}$. The sets of transmitted signals are added in each of the resonance circuits $71_1, 71_2, \ldots 71_n$. Each of the impedance elements $65_{11} - 65_{nm}$ is connected in parallel to each of the corresponding resonance circuits $64_{11} - 64_{nm}$ so that the set of intermediate output signals are added to each other with the synaptic coupling weights which are determined by impedances of the impedance elements $65_{11} - 65_{nm}$, the resonance circuits $64_{11} - 64_{nm}$ and the resonance circuits $71_1 - 71_n$. The synaptic coupling weights can be adaptively adjusted by setting impedance values of the impedance elements $65_{11} - 65_{nm}$ through the corresponding synaptic coupling weight control terminals $62_{11} - 62_{nm}$ by the learning function unit (not shown).

Output signals of the columns of the resonance circuits $71_1, 71_2, \ldots 71_n$ are amplified by the respective differential amplifiers $72_1, 72_2, \ldots 72_n$, and further compared by the respective comparators $73_1, 73_2, \ldots 73_n$ with respective threshold values $S_1, S_2, \ldots S_n$ which are supplied separately from threshold value input terminals $74_1, 73_2, \ldots 73_n$ to thereby finally develop output signals at the n output terminals $75_1, 75_2, \ldots 75_n$.

Figure 10:
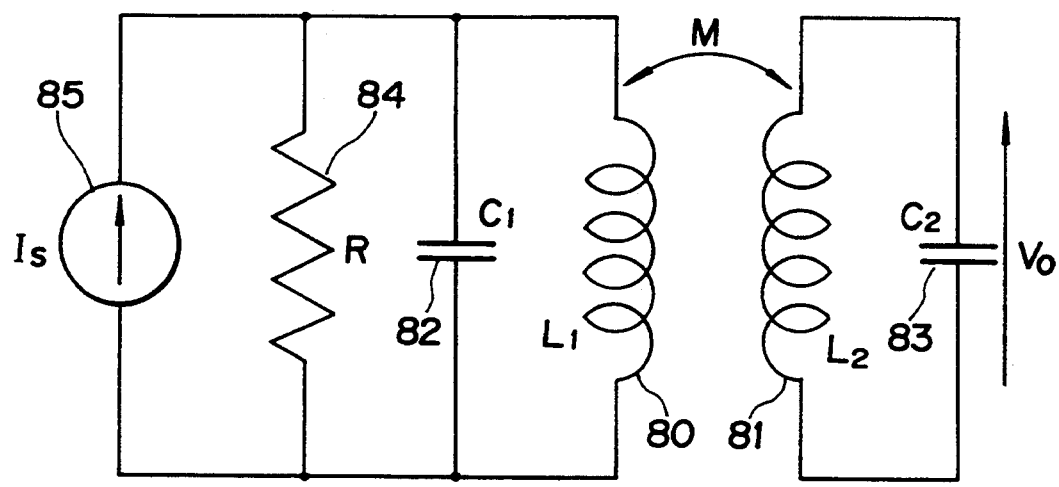
FIG. 10 is an explanatory diagram of an electromagnetically resonant neural network with inductive coupling.

Next, the general description is given for the operation of the electromagnetically coupled resonance circuits with reference to FIG. 10. The electromagnetic coupling is comprised of coils 80, 81, capacitors 82, 83, a resistor 84 and an alternating current source 85. A primary resonance circuit is comprised of coil 80, capacitor 82, resistor 84 and alternating current source 85, all connected in parallel to the primary resonance circuit. A secondary resonance circuit comprises coil 81 and the capacitor 83. Here, $L_1$ and $L_2$ respectively denote the inductances of the coils 80 and 81, $C_1$ and $C_2$ respectively denote the capacitances of capacitors 82 and 83, respectively, R denotes resistance of the resistor 84, and $I_s = I_o \sin \omega t$ denotes an output current of the alternating current source 85. The primary resonance circuit is held in the resonant state to satisfy the following relation:

$$\omega L_1 = 1/\omega C_1 \qquad (3)$$

On the other hand, an induced voltage is generated in the secondary resonance circuit due to mutual induction between the coils 80 and 81. The voltage $V_0$ developed across the terminals of the capacitor 83 is represented by the following relation:

$$V_0 = MRI_s / [\{L_1(1-\omega^2(C_2L_2)+\omega^2C_2M^2\}+j\omega^3RC_1C_2M^2] \qquad (4)$$

where M denotes mutual inductance between the coils 80 and 81 and is represented by $M^2 = K^2 L_1 L_2$ where K indicates coupling coefficient.

According to the relation (4), the voltage $V_0$ induced in the secondary resonance circuit is proportional to the product of the current $I_s$ in the primary resonance circuit and the resistance R. Therefore, by changing the value of resitance R, the voltage $V_0$ can be varied. Changes of the value of the resistance R change the resonance circuit selectively.

Figure 11:
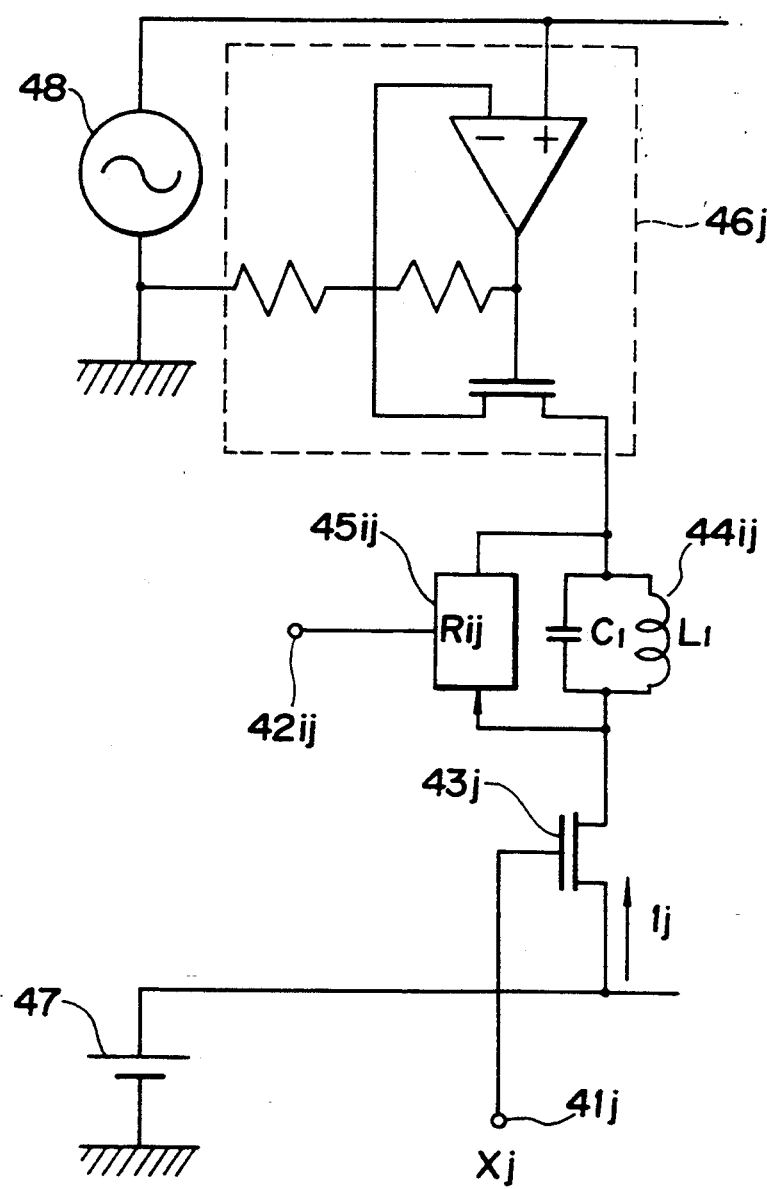
FIG. 11 is an explanatory diagram of the operation of the FIG. 9 circuit.

Next, the description is given for the operation of the FIG. 9 neural network with reference to FIG. 11 which examplifies one circuit section of the first block 40. The circuit section is comprised of an input terminal $41_j$, a synaptic coupling weight control terminal $42_{ij}$, a transistor $43_j$ (FET), a resonance circuit $44_{ij}$, an impedance element $45_{ij}$, a constant current circuit $46_j$ composed of an operational amplifyer, a transistor and resistors, a direct current source 47, and an alternating current source 48 (where $j=1, 2, \ldots l, i=1, 2, \ldots m$). The input terminal $41_j$ receives an input signal voltage $X_j$ which may have either of high and low levels. When the input voltage $X_j$ exceeds a threshold value of the transistor $43_j$, a current $I_j$ is flown throughout the j-th column of resonance circuits $44_{ij}$ ($i=1, \ldots m$). The current $I_L$ flowing in the coil of the resonance circuit $44_{ij}$ is represented by the following relation:

$$I_L = (1-\omega^2 C_2 L_2)R_{ij}I_j / [-\omega^4 R_{ij}C_1C_2M^2 + j\{\omega L_1(1-\omega^2 C_2L_2)+\omega^3C_2M^2\}] \qquad (5)$$

where $L_1$ denotes inductance of the coil of the resonance circuit $L_1$ denotes inductance of the coil of the corresponding resonance circuit $51_i$ (not shown) in FIG. 11, but shown in FIG. 9 of the second block 50, which corresponds to the resonance circuit $44_{ij}$, M denotes mutual inductance therebetween, $C_1$ and $C_2$ denote capacitances of the capacitors in the resonance circuits $44_{ij}$ and $51_i$, respectively, and $R_{ij}$ denotes impedance of the impedance element $45_{ij}$. The resonance circuit $44_{ij}$ of the first block 40 transmits an electromagnetic wave proportional to the current $I_L$ flowing through the coil. As understood from relation (5), the current $I_L$ is proportional to $R_{ij}I_j$. As decribed before, the i-th row of the resonance circuits $44_{ij}$ ($j=1, 2, \ldots l$) of the first block 40 are electromagnetically coupled to the i-th lenear resonance circuit $51_i$ of the second block 50 so that the i-th resonance circuit $51_i$ of the second block 50 induces a voltage proportional to sum of the currents flowing through the respective coils of the resonance circuits $44_{ij}$ ($j=1, 2, \ldots l$) of the first block 40.

In the second block 50, the induced voltage is amplified by the i-th differential amplifier $52_i$, and thereafter is detected by the i-th comparator $53_i$. Therefore, the output signal voltage $Y_i$ of the i-th comparator $53_i$ is represented by the following relation:

$$Y_i = \alpha \Sigma R_{ij} I_j \qquad (6)$$

where $\alpha$ denotes a proportionality constant. According to the relation (6), the output signal voltage $Y_i$ of the second block 50 is obtained by a multiplication and summation operation in the form of matrix/vector products of impedance $R_{ij}$ and current $I_j$.

Similar operation is effected between the respective resonance circuits of the third block 60 and the corresponding resonance circuit of the fourth block 70. The output signal voltage $Z_k$ ($k=1, 2, \ldots n$) is likewise obtained by a multiplication and summation operation in the form of matrix/vector products of the impedance $Q_{ki}$ of the impedance element $65_{ki}$ and the current $I_i$.

The impedances $R_{ij}$ and $Q_{ki}$ are controlled, respectively, through the synaptic coupling weight control terminals $42_{ij}$ and $62_{ki}$ by the learning function unit. In the preferred illustrated embodiment, the impedances $R_{ij}$ and $Q_{ki}$ are purely resistive so that the selectivity is changed in the resonance circuits $44_{ij}$ and $64_{ki}$ by the learning operation. Accordingly, the phase of the transmitted electromagnetic wave does not change, and therefore it is not necessary to compensate for any phase difference.

Further, the currents $I_j$ and $I_i$ are controlled, respectively, by the input voltage $X_j$ to transistor $43_j$ and the intermediate input voltage $Y_i$ to transistor $63_i$, hence the currents $I_j$ and $I_i$ are, respectively, functions of the input voltages $X_j$ and $Y_i$, i.e., $I_j=f(X_j)$ and $I_i=f(Y_i)$. These functions are determined by the characteristics of the transistors $43_j$ and $63_i$. In the later-described simulation, the functions are approximated as being of the sigmoid type. In the foregoing description, the voltages $X_j$, $Y_i$ and $Z_k$ are actually values before processing by a non-linear function such as a sigmoid function. To provide positive and negative synaptic coupling weights in a practical device, the resonance circuits $44_{ij}$ and $64_{ki}$ are combined with other resonance circuits (not shown in FIGS. 9 and 11) having reversely wound coils and corresponding impedance elements and another synaptic coupling weight control terminal.

Each of impedance elements $45_{ij}$ and $65_{ki}$ may be composed, for example, of a MOS-FET. Such, a MOS-FET has its source and drain terminals connected in parallel to the individual resonance circuit, and its gate terminal connected to the synaptic coupling weight control terminal. The synaptic coupling weight control terminal is supplied with a gate voltage controlled by the learning function unit so that the channel resistance between the source and drain terminals is adaptively set to determine optimum synaptic coupling weight.

Alternatively, the synaptic coupling weight may be adjusted by using a voltage-controlled variable capacitor of a type generally utilized in an electronic synchronization circuit. Namely, the resonance circuits $44_{ij}$ and $64_{ki}$ can be comprised of a variable capacitor, and the capacitance value thereof can be controlled by a voltage derived inputted from the learning function unit. Concurrently, the current flowing through the resonance circuits $44_{ij}$ and $64_{ki}$ is varied to thereby change the magnitude of voltage induced in the corresponding secondary resonance circuits $51_i$ and $71_k$.

The constant current circuits $46_j$ and $66_i$ respectively drive the j-th column of the resonance circuits of the first block 40 and i-th row of the resonance circuits of the third block 60; since circuits $46_j$ and $66_i$ are constant current sources that the currents $I_j$ and $I_i$ are not affected by changes of the above-mentioned impedances.

Figure 12:
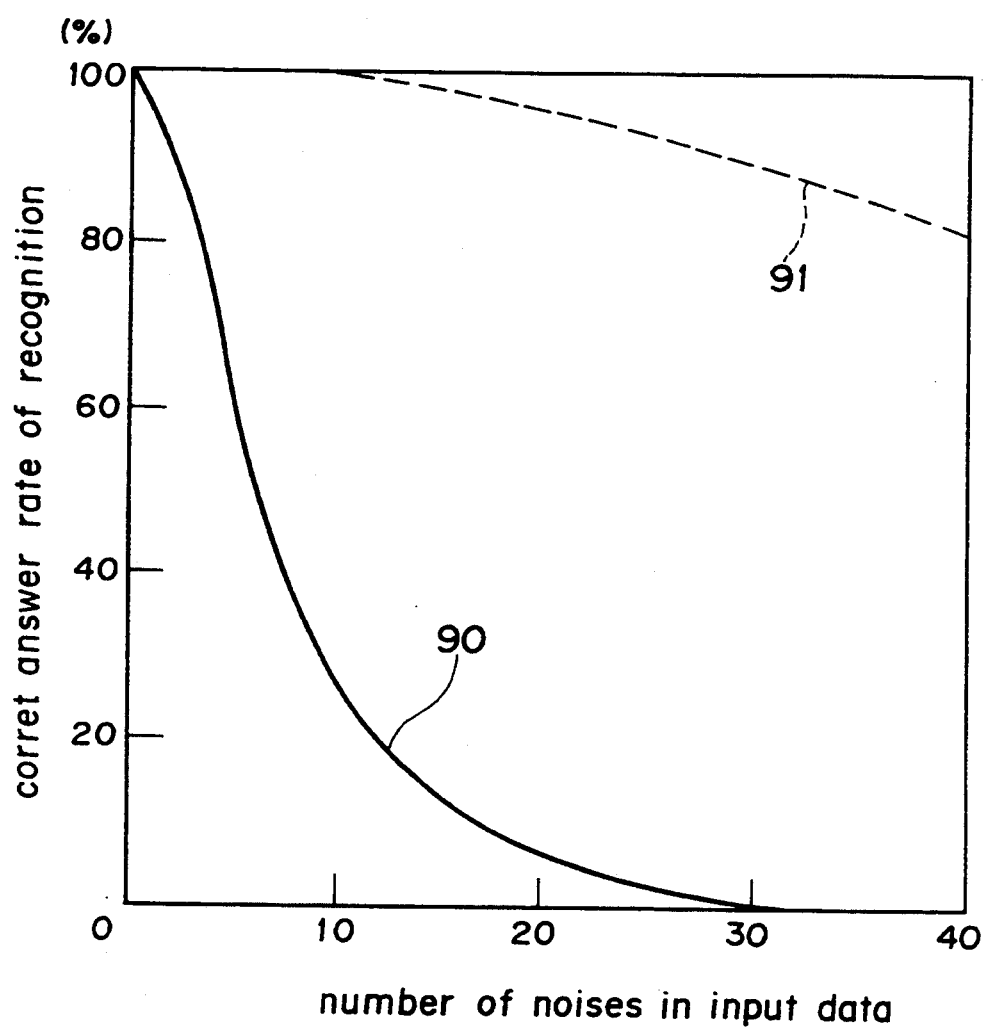
FIG. 12 is a graph of the relation between number of noise occurrences in input data and correct answer rate in the recognition.

Lastly, simulation is undertaken to evaluate the performance of the FIG. 9 neural network. Namely, the first block 40 has 81 input terminals, the second block 50 has 20 output terminals which correspond to those of the intermediate output terminals of the third block 60, and the fourth block 70 has 26 final output terminals. The input voltage $X_j$ is set to ±5V, the inductance of the coils of the resonance circuits is set to 10 nH in the first block 40 and the third unit 60, the capacitance of the capacitors of these resonant circuits is set to 2.533 pF, the frequency of the power source is set to 1 GHz, so the resonance circuits are in the resonant state. A limiter is utilized with the impedance elements such that the impedance $R_{ij}$ has value in the range of 0–1K $\Omega$ for positive and negative input values. Consequently, if the adjusted value of impedance $R_{ij}$ according to the learning mode exceeds 1K $\Omega$, the impedance $R_{ij}$ is actually limited to 1K $\Omega$. The amplitude change of the currents $I_j$, $I_i$ fed from the constant current circuits is set in the range of 0–10 mA. The inductance of coils of the secondary resonance circuits is set to 20 nH in the second block 50 and the fourth block 70, and capacitance of capacitors of the secondary resonance circuits is set to 2.533 pF. Lastly, the coupling coefficient K between the coils of the primary resonance circuits in the first and third blocks 40, 60 and the corresponding coils of the secondary resonance circuits in the second and fourth blocks 50, 70 is set to 0.1. Learning is carried out according to back-propagation learning rule. Under the above-mentioned condition, 277 learning trials are undertaken until saturation to establish stable recognition of the 26 capital letters of the English alphabet. Further, in FIG. 12 is shown the relation between number of noise occurrences in the input data and correct recognition answer rate. In the graph, the solid curve 90 indicates the results when the number of input data is set to $8 \times 8 = 64$, and the broken curve 91 indicates the results when the number of input data is set to $40 \times 40 = 1600$.

In order to practice the invention, the neural network can be constructed in the form of an integrated circuit which contains coils and capacitors. In such case, spiral coils can be formed of gold plating film on the integrated circuit substrate, and capacitors having capacitance of 1–20 pF can be formed of dielectric material film such as silicon nitride $Si_3N_4$ on the integrated circuit of the planar type. Further, an integrated circuit utilizing FETs of gallium arsenide can be used in the high frequency range of more than 40 GHz. By increasing the operating frequency, inductances and capacitances in the resonance circuits can be reduced in size to thereby enable production of a practical neural network by currently available fabrication technology. In the present invention, analog signals are transmitted through magnetic, electric or electromagnetic field coupling by using coils and capacitors. Variations may be caused in circuit parameters such as inductance of coils and capacitance of capacitors during the fabrication processing. However, such circuit parameter variations can be effectively canceled during the learning procedure, because the synaptic coupling weights are adaptively determined during the learning operation to obtain optimum results in the neural network to thereby absorb the above-noted variations.

Figure 13A:
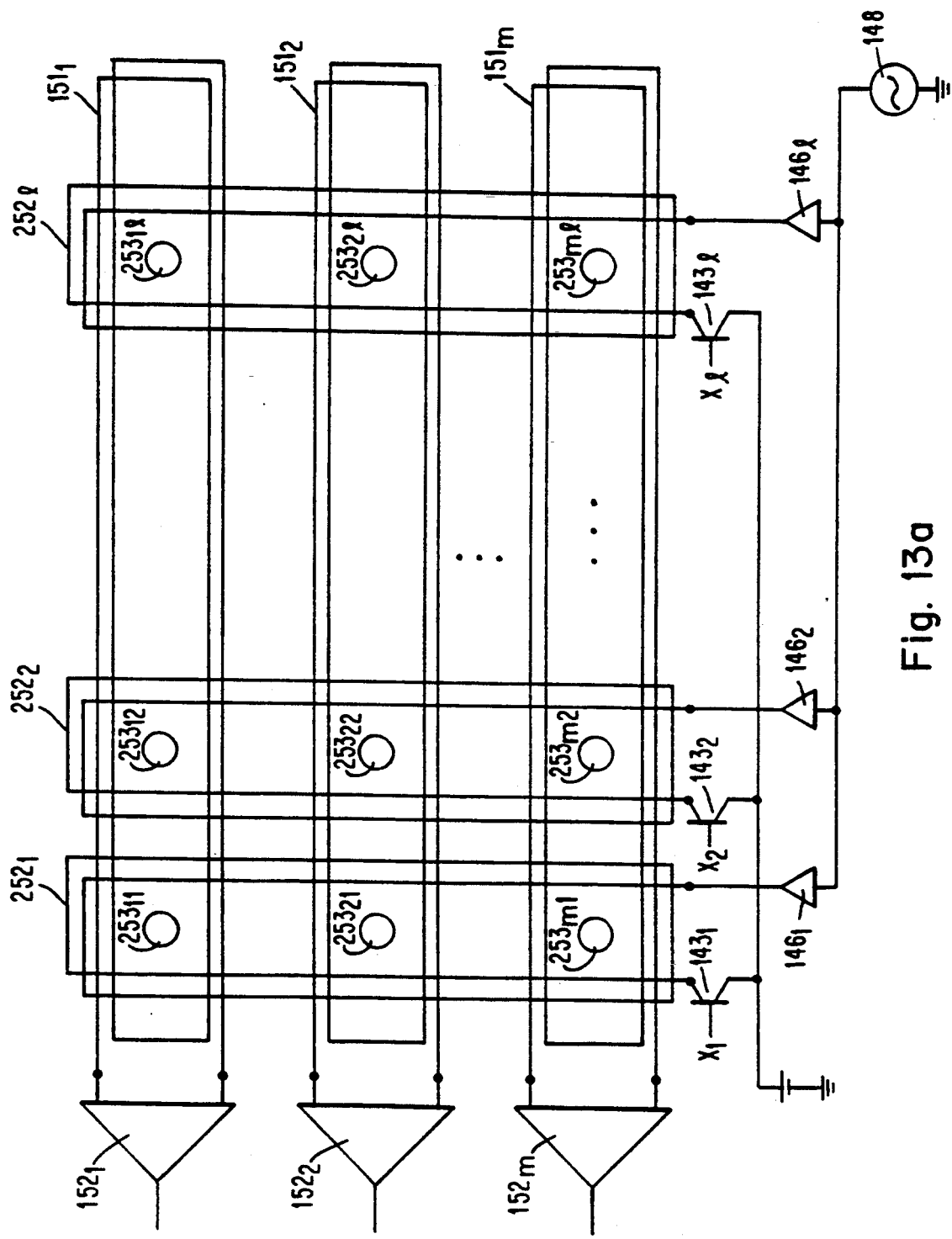
FIG. 13a and 13b, together, are a circuit diagram of a hybrid version of a neural network in accordance with the present invention.
Figure 13B:
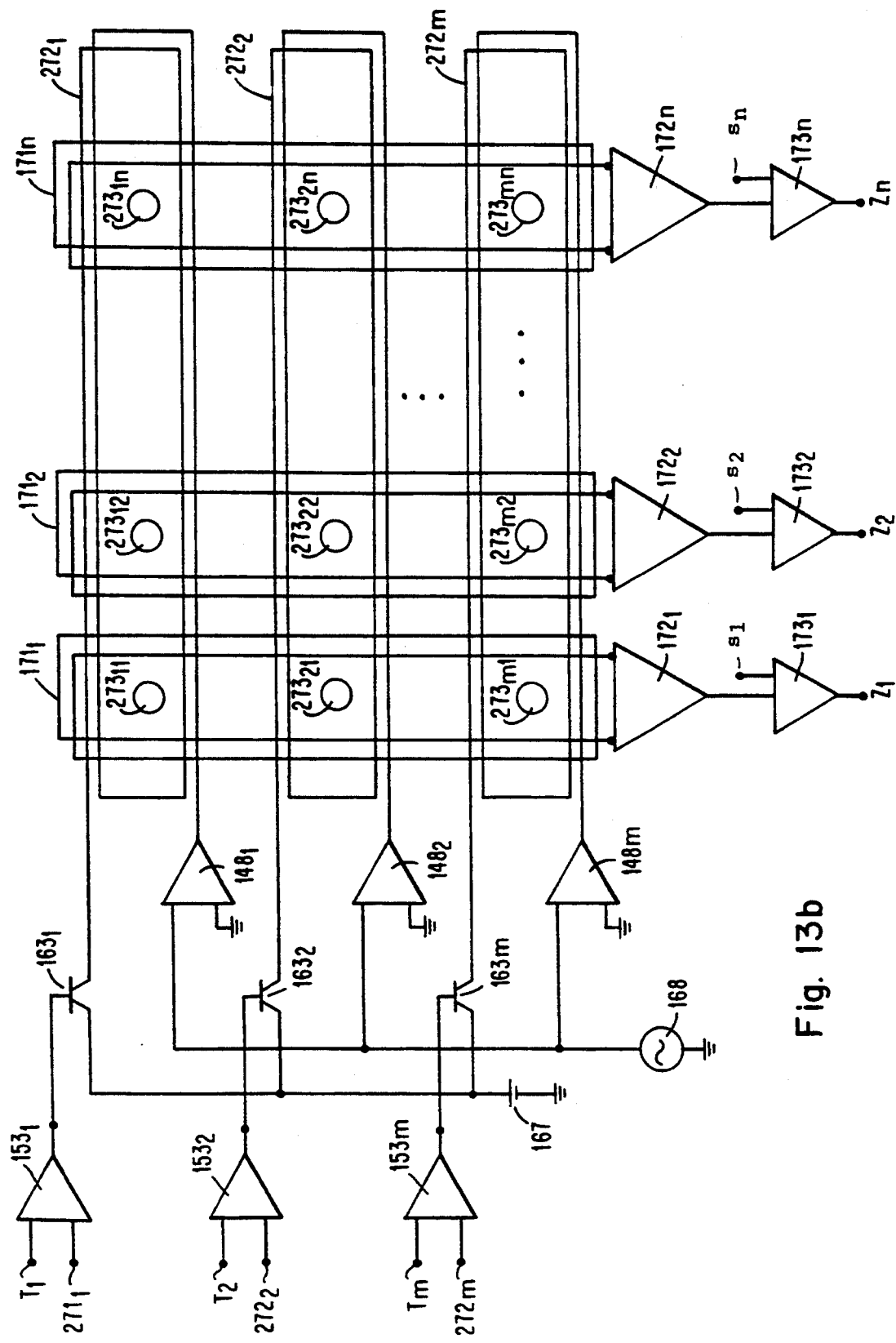
Figure 14:
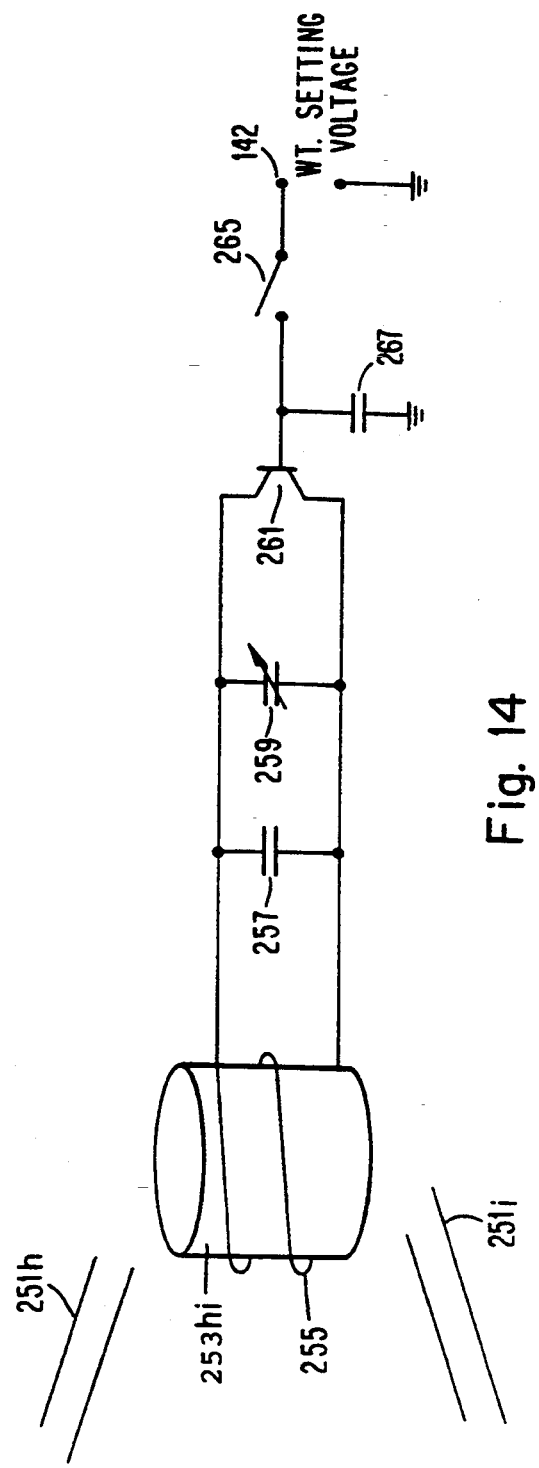
FIG. 14 is a schematic diagram of a portion of the circuit elements illustrated in each of FIGS. 13a and 13b.

Reference is now made to FIGS. 13a, 13b and 14, schematic diagrams of a hybrid apparatus for performing the same functions as performed by the apparatus illustrated in FIG. 9. Elements in FIGS. 13a and 13b corresponding to elements in FIG. 9 are indicated in FIGS. 13a and 13b by digits having the same units and tens value as the reference numerals of FIG. 9; however in FIGS. 13a and 13b these corresponding elements have a value of 1 in the hundreds digit. The apparatus illustrated in FIG. 13a corresponds with the elements on the left side of FIG. 9, i.e., the elements in FIG. 9 responsive to signals $X_1, X_2 \ldots X_1$ and the remaining apparatus for deriving signals that are compared with signals $T_1, T_2 \ldots T_m$. The apparatus illustrated in FIG. 13b corresponds to the structure illustrated on the right side of FIG. 9 and thus includes the comparators responsive to signals $T_1, T_2 \ldots T_m$ and the remaining apparatus for deriving output signals $Z_1, Z_2 \ldots Z_n$.

The apparatus illustrated in FIG. 13a includes a two dimensional x-y matrix of elongated coils $151_1, 151_2 \ldots 151_m$, which are spatially parallel to each other and extend in the x direction. The matrix of FIG. 13a also includes elongated coils $252_1, 252_2 \ldots 252_l$. Each of coils $252_1, 252_2 \ldots 252_l$ extends in the y direction, i.e., at right angles to coils $151_1, 151_2 \ldots 151_m$. At each intersection of coils 151 and 252 there is a cylindrical magnetic core 253. For example, at the intersection of coils $151_1$ and $252_1$ is located core $253_{11}$; at the intersection of coils $151_m$ and $252_l$, core $253_{ml}$ is located; and at the intersection of coils $151_h$ and $252_i$, core $253_{hi}$ is located, where h is selectively each of 1, 2 . . . m and i is selectively each of 1, 2 . . . l. The magnetic core 253 at each intersection magnetically couples the coils at the particular intersection to each other. Each of cores 253 and the coils associated therewith correspond with the resonant coupling circuits 44 on the left side of FIG. 9.

A preferred configuration of coils 151 and 252 and one of cores 253 is illustrated in FIG. 14. Core 253 is positioned so its axis extends between coils 151 and 252 which are located in close proximity to opposite end faces of the core. Helical winding 255, wound about the side wall of core 253, is shunted by fixed capacitor 257 and variable capacitor 259, both of which are connected in parallel with the source drain path of field effect transistor 261, to form a circuit resonant to the frequency of AC source 148. The resistance of the source drain path of field effect transistor 261 is controlled by the magnitude of the weight setting voltage at terminal 142, selectively applied through switch 265 to the gate of transistor 261, shunted by capacitor 267. Hence, while switch 265 is closed, variations in the value of the weight setting voltage at terminal 142 control the resistance of the resonant circuit including coil 255 and capacitors 257 and 259.

AC source 148 drives each of coils $252_1, 252_2 \ldots 252_l$ through amplifiers $146_1, 146_2 \ldots 146_l$, respectively. The magnitude of the AC current flowing in coils $252_1, 252_2 \ldots 252_l$ is respectively controlled by the source drain resistance of field effect transistors $143_1, 143_2 \ldots 143_l$. The source drain resistance of each of field effect transistors $143_1, 143_2 \ldots 143_l$ is in turn controlled by the magnitude of the DC signals $X_1, X_2 \ldots X_l$. The magnitude of the AC voltage thereby induced in a particular coil $151_h$ in response to the current flowing in a particular coil $252_i$ is thereby proportional to the AC current magnitude flowing in the particular coil $252_i$ coupled to the coil $151_h$ and the magnitude of the weight setting voltage at terminal $142_{hi}$ applied to the field effect transistor at a particular intersection, as well as the magnitude of the voltage $X_i$ applied to transistor $143_i$ connected to the particular coil $252_i$. The total voltage induced in a particular coil $151_i$ is thereby proportional to the sum of the voltages induced in the coil as a result of coupling from coils $252_1, 252_2 \ldots 252_l$. Hence, the voltage at output terminals of each of coils $151_1, 151_2 \ldots 151_m$ is analogous to the voltage derived from each of coils $51_1, 51_2 \ldots 51_m$. The voltages at the output terminals of coils $151_1, 151_2 \ldots 151_m$ are respectively applied to input terminals of amplifiers $152_1, 152_2 \ldots 152_m$.

The output voltages of amplifiers $152_1, 152_2 \ldots 152_m$ are respectively applied to input terminals $272_1, 272_2, 272_m$ of each of comparators $153_1, 153_2 \ldots 153_m$, FIG. 13b. Comparators $153_1, 152_2 \ldots 153_m$ compare the signal supplied to them by amplifiers $152_1, 152_2 \ldots 152_m$ with signals having values $T_1, T_2 \ldots T_m$, respectively. Each of comparators $153_1, 153_2 \ldots 153_m$ derives an supplied to it. The outputs of comparators $153_1, 153_2 \ldots 153_m$ are respectively applied to the gates of field effect transistors $163_1, 163_2 \ldots 163_m$. The source drain resistances of field effect transistors $163_1, 163_2 \ldots 163_m$ are thereby respectively controlled by the magnitude of the output voltages of comparators $153_1, 153_2 \ldots 153_m$. The source drain paths of transistors $163_1, 163_2 \ldots 163_m$ are energized by DC voltage source 167.

Transistors $163_1, 163_2 \ldots 163_m$ are connected to an x-y matrix of mutually orthogonal elongated coils $171_1, 171_2 \ldots 171_n$ and $272_1, 272_2 \ldots 272_m$. Each of coils $171_1, 171_2 \ldots 171_n$ is elongated so it extends in the y direction while each of coils $272_1, 272_2 \ldots 272_m$ is elongated to extend in the x direction so coils $171_1, 171_2 \ldots 171_n$ are all parallel to each other and at right angles to coils $272_1, 272_2 \ldots 272_m$, which are parallel to each other. At each intersection of coils $171_1, 171_2 \ldots 171_n$ and $272_1, 272_2 \ldots 272_m$ is a cylindrical magnetic core 273 so that at the intersection of coils $171_1$ and $272_1$, core $273_{11}$ is located, at the intersection of coils $171_h$ and $272_i$, core $273_{hi}$ is located and at the intersection of coils $171_n$ and $272_m$ is core $273_{nm}$, where h is selectively each of 1, 2 . . . n and i is selectively each of 1, 2 . . . m.

Core 273 at each intersection of coils 171 and 272 is part of a resonant circuit, constructed identically to the resonant circuit of FIG. 14 to include a fixed capacitor, a variable capacitor and a variable, voltage controlled resistance. The voltage controlled resistor is the source drain path of a field effect transistor having a gate electrode responsive to a weight setting voltage corresponding to the voltage at terminal 62. The resonant circuit at each intersection of coils 171 and 272 is resonant to the frequency of AC source 168 which drives coils $272_1, 272_2 \ldots 272_m$ via the outputs of AC amplifiers $148_1, 148_2 \ldots 148_m$, respectively. The inputs of amplifiers $148_1, 148_2 \ldots 148_m$ are driven in parallel by AC source 168. The AC currents flowing in coils $272_1, 272_2 \ldots 272_m$ are controlled, inter alia, by the magnitude of the source drain resistances of transistors $163_1, 163_2 \ldots 163_m$, respectively.

The voltage induced in winding $171_1$ by core $273_{11}$ is proportional to the current flowing in winding $272_1$ and the coupling coefficient of core $273_{11}$ between coils $272_1$ and $171_1$. The core coupling coefficient is determined by the value of the voltage controlled resistor in parallel with the coil corresponding with coil 255, FIG. 14. A similar relationship exists between the voltage induced in coils $171_1, 171_2 \ldots 171_n$ at each intersection of these coils with coils $272_1, 272_2 \ldots 272_m$. Hence, the voltage induced in coil $171_1$ is equal to the sum of the voltages induced in the coil by coupling via cores $273_{11}, 273_{12} \ldots 273_{1m}$. In a similar manner, the sum of the voltages induced in each of coils $171_1, 171_2 \ldots 171_n$ is equal to the sum of the individual voltages induced in the particular coil at each intersection thereof with coils $272_1, 272_2 \ldots 272_m$.

Coils $171_1, 171_2 \ldots 171_n$ have output terminals respectively connected to input terminals of amplifiers $172_1, 172_2 \ldots 172_n$. Amplifiers $172_1, 172_2 \ldots 172_n$ derive output signals respectively applied to one input terminal of each of comparators $173_1, 173_2 \ldots 173_n$, also having input terminals responsive to AC voltages having values represented by $S_1, S_2 \ldots S_n$. Comparators $173_1, 173_2 \ldots 173_n$ thereby derive output signals $Z_1, Z_2 \ldots Z_n$ representing the difference between the AC voltages applied to the input terminals thereof. All AC voltages applied to the circuits of FIGS. 13a, 13b and 14 have the same frequency, equal to the resonant frequency of the magnetic core at each intersection in the matrices of FIGS. 13a and 13b.

As described above, according to the first aspect of the present invention, since the input terminal and the neuron or the pair of neurons are inductively coupled by a magnetic or electromagnetic field multiple input terminals and neurons or multiple neurons themselves can be spatially coupled by the mature technology to achieve overall parallel coupling with each other.

According to the second aspect, since a an inductive coupling device or circuit is utilized to couple between an input terminal and a neuron or between a pair of neurons through the magnetic, multiple input terminals and neurons and multiple neurons themselves can be spatially coupled with each other by the mature technology so as to provide a neural network having parallel couplings.

According to the third aspect, at least a pair of magnetically coupled inductance elements are used as a coupling device through magnetic field so as to facilitate circuit design of the neural network, and to realize a practical neural network.

According to the fourth aspect, since the inductance element is composed of a coil, coupling can be provided economically with less spacing between input terminals and neurons and among the neurons.

According to the fifth aspect, since a magnetic resistance element is used as the inductance element, coupling can be effected through DC magnetic fields as well as AC magnetic fields, thereby increasing design freedom.

According to a sixth aspect, since at least one resonance circuit is used as a coupling circuit through magnetic field, efficient spatial couplings can be constructed between input terminals and neurons and among neurons.

According to the seventh aspect, the neural network is comprised of a plurality of input terminals, a plurality of primary neurons each having an output, a secondary neuron having an input, a plurality of primary coils magnetically coupled to each other and each connected to each of the input terminals or each output of the primary neurons, and a secondary coil magnetically coupled to the primary coils and connected to the input of the secondary neuron; hence the parallel couplings can be constructed between the plural input terminals and the secondary neuron and between the plural primary neurons and the secondary neuron, thereby reducing overall neural network size.

According to the eighth aspect, the neural network is comprised of a plurality of input terminals, a plurality of primary neurons each having an output, multiple primary coils each being connected to each of the input terminals or each output of the primary neurons, multiple secondary coils each magnetically coupled to a set of the primary coils each selected from different groups of the primary coils corresponding to respective input terminals or respective outputs of the primary neurons, and a multiple of secondary neurons each having an input connected to each of the secondary coils; hence the parallel couplings can be constructed between the plural input terminals or the plural primary neurons and the multiple secondary neurons, thereby enabling further reduction of the overall size of the neural network circuit size.

According to the ninth aspect, since all or part of the coils are incorporated into a resonance circuit, the couplings can be constructed efficiently in parallel between the plural input terminals or the plural primary neurons and the single or multiple secondary neuron.

According to the tenth aspect, since an impedance element is connected in series with or parallel to the coil or resonance circuit so as to define the synaptic coupling weights, the couplings can be ensured between the plural input terminals or the plural primary neurons and the single or multiple secondary neuron to enable the secondary neuron to effect multiplication and summation operations. Consequently, there is realized a neural network having a smaller size and a greater number of neurons.

According to the eleventh aspect, since the synaptic coupling weight can be adjusted by changing the impedance of the impedance element, the multiplication and summation operations can be controllably carried out in single or multiple neurons. Consequently, there can be realized an efficient neural network having a smaller size and a greater number of neurons.

What is claimed is:

1. A neural network comprising: a plurality of input terminals; a plurality of primary neurons each having an output; multiple primary coils, each of the input terminals being connected to one of said primary coils; the output of each of the primary neurons being connected to others of said primary coils; multiple secondary coils; some of said secondary coils being magnetically coupled to the primary coils respectively connected to the input terminals; others of said secondary coils being magnetically coupled to the others of the primary coils respectively connected to the outputs of the primary neurons; and multiple secondary neurons each having an input connected to each of the secondary coils.

2. The neural network of claim 1 further including a plurality of resonance circuits including the multiple primary and secondary coils.

3. The neural network of claim 1 further including a plurality of impedance elements each connected to a corresponding coil to define a synaptic coupling weight.

4. A neural coupling for coupling a precedent node to a subsequent node to synaptically transmit a signal through a neural network, comprising: primary means responsive to a signal from a precedent node for generating an inductive field according to the received signal; and secondary means spatially coupled to the primary means by the inductive field for supplying to a subsequent node a corresponding signal in response to the inductive field for synaptically transmitting the signal through the neural network, the primary means including a primary element electrically connected to one of said precedent nodes for generating an inductive field, the secondary means including a secondary element inductively coupled to the primary element and electrically connected to one of said subsequent nodes, the primary means including multiple primary elements each connected to respective one of multiple ones of said precedent nodes, the secondary means including a single secondary element commonly inductively coupled to the multiple primary elements.

5. A neural coupling according to claim 4; wherein the secondary element comprises a magnetoresistance element responsive to the inductive magnetic field.

6. A neural coupling according to claim 4; wherein the primary element comprises a primary resonance circuit for generating an inductive electromagnetic field, and the secondary element comprises a secondary resonance circuit inductively coupled to the primary resonance circuit by the electromagnetic field.

7. A neural coupling for coupling a precedent node to a subsequent node to synaptically transmit a signal through a neural network, comprising: primary means responsive to a signal from a precedent node for generating an inductive field according to the received signal;

and secondary means spatially coupled to the primary means by the inductive field for supplying to a subsequent node a corresponding signal in response to the inductive field for synaptically transmitting the signal through the neural network, the primary means including a primary element electrically connected to one of said precedent nodes for generating an inductive field, the secondary means including a secondary element inductively coupled to the primary element and electrically connected to one of said subsequent nodes, the primary means including an array of primary elements arranged in rows and columns, each column of the primary elements being electrically connected to a respective one of a plurality of said precedent nodes, the secondary means including plural linear secondary elements arranged in parallel rows, each of said linear secondary elements being inductively coupled to each corresponding row of the primary elements and being electrically connected to a respective one of a plurality of said subsequent nodes.

8. The neural coupling of claim 16 further including a primary planar substrate having formed integrally thereon an array of said primary elements, and a secondary planar substrate having formed integrally thereon a plurality of said linear secondary elements connected in parallel, the secondary planar substrate being spatially opposed to the primary planar substrate such that the linear and parallel connected secondary elements are spatially aligned with the array of primary elements to constitute the inductive coupling therebetween.

9. A neural coupling for coupling a precedent node to a subsequent node to synaptically transmit a signal through a neural network, comprising: primary means responsive to a signal from a precedent node for generating an inductive field according to the received signal; and secondary means spatially coupled to the primary means by the inductive field for supplying to a subsequent node a corresponding signal in response to the inductive field for synaptically transmitting the signal through the neural network, adaptive means for adaptively adjusting the value of a synaptic coupling weight by controlling the inductive field magnitude for synaptically transmitting the signal, the primary means including a resonance circuit for generating an inductive electromagnetic field, and the adaptive means including a variable impedance element electrically connected to the resonance circuit for controlling the inductive electromagnetic field magnitude according to the variable impedance element impedance value which determines the synoptic coupling weight.

* * * * *